May 27, 1930. F. L. CRADDOCK Re. 17,683
MIXING DEVICE
Original Filed July 31, 1923 3 Sheets-Sheet 1
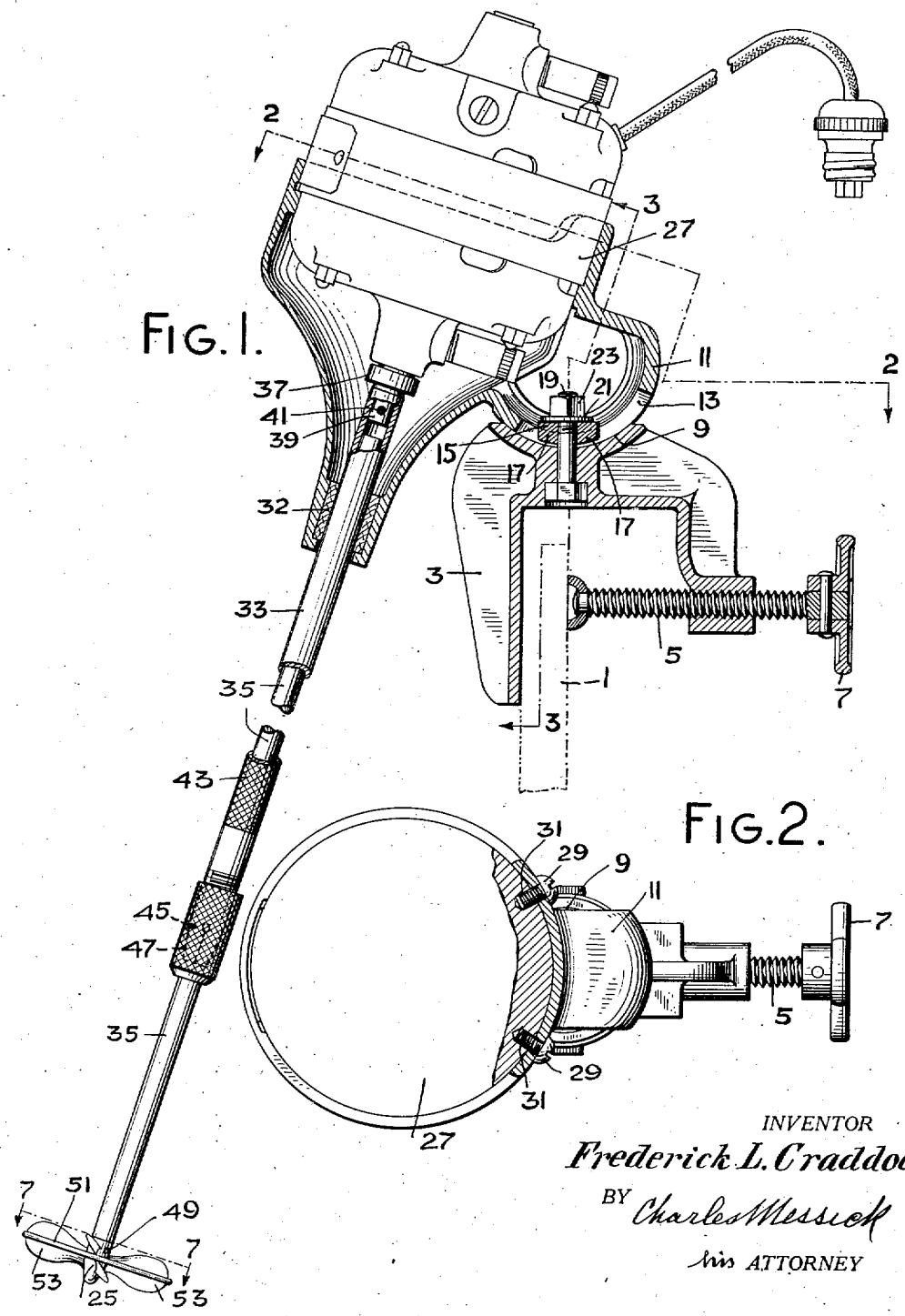
INVENTOR
Frederick L. Craddock
BY Charles Messick
his ATTORNEY May 27, 1930. F. L. CRADDOCK Re. 17,683

MIXING DEVICE

Original Filed July 31, 1923 3 Sheets-Sheet 2

INVENTOR
Frederick L. Craddock
BY Charles Messick
his ATTORNEY

May 27, 1930. F. L. CRADDOCK Re. 17,683

MIXING DEVICE

Original Filed July 31, 1923 3 Sheets-Sheet 3

INVENTOR
Frederick L. Craddock
BY
Charles Messick
ATTORNEY

Reissued May 27, 1930

Re. 17,683

UNITED STATES PATENT OFFICE

FREDERICK L. CRADDOCK, OF ROCHESTER, NEW YORK, ASSIGNOR TO MIXING EQUIPMENT COMPANY, INC., OF ROCHESTER, NEW YORK, A CORPORATION OF NEW YORK

MIXING DEVICE

Original application filed July 31, 1923, Serial No. 654,825. Renewed April 4, 1928. Original No. 1,703,099, dated February 26, 1929. Application for reissue filed November 25, 1929. Serial No. 409,726.

My invention particularly relates to the type of apparatus which is used to stir together and mix food products and other liquids or solids and mixtures of various materials.

A problem which I seek to solve is to provide a mixing device having one or all of the following advantages: low first cost, adjustable, efficient, light weight universal applicability, not liable to accidental damage.

I have found that mixes vary in viscosity and specific gravity and that the position of the mixing propeller or equivalent has to be adjusted in depth of submersion. The axis of rotation is in a vertical plane external to the centre of the tank for the most efficient results.

I have also found that the size and shape of the mixing tank affects the location of the ideal position for the mixing propeller, although usually the propeller shaft works best at a small angle from the perpendicular. The propeller stream is thus abruptly deflected when striking the bottom and gently deflected by the side of the tank, providing a method for emulsifying and pulverizing the particles of the mix in contrast to the gentler blending and stirring effected in the apparatus of my patent for angular fluid mixers No. 1,548,935, issued August 5, 1925, in which the propeller stream is usually horizontal.

I have also found that in some cases where air bubbles and froth are desired in the mix different adjustments are required from those where aeration of the mix, or merely a thorough mix, is the desideratum.

The object of my invention is to provide an improved mixing device designed for mounting at the top of a tank, having a screw propeller extending down into the tank and designed to cause the propeller stream to impinge upon a side of the tank whereby the coaction of the propeller stream and the side wall will cause a rolling action of the mix and successively bring all parts of the mix into contact with all other parts thereof. Thus also preferably causing successively every part of the mix to be abruptly deflected and pulverized when striking the bottom of the tank.

Another object of my invention is to provide improved means for mounting my mixing device, preferably at the edge of a tank and preferably by means of an adjustable joint whereby the angle of the propeller stream with respect to the side wall may be varied. A universal joint designed for locking in any desired position to facilitate both horizontal and vertical adjustment of the propeller stream is the preferred construction.

Another object of my invention is to provide a mixing device which is universally adjustable and lockable into positions whereby the propeller stream will impinge upon and coact with the side wall of a tank to cause a rolling as well as a rotation about a vertical or a horizontal axis alone.

Another object of my invention is to provide a mixing device which will fulfill the above requirements in an improved manner, preferably using a standard motor, etc., and requiring a minimum of special parts. Another object is to provide improved constructional details for such a device, as may appear from the following description of a preferred construction, and be pointed out in the claims.

Referring to the accompanying drawings:

Fig. 1 is a side view, partly in section of my mixing device clamped to a fragment of the edge of a mixing tank, which is indicated in double dot and single dash lines;

Fig. 2 is a section taken on the line 2—2 of Fig. 1, particularly showing the clamp and adjustable mounting;

Figure 3:
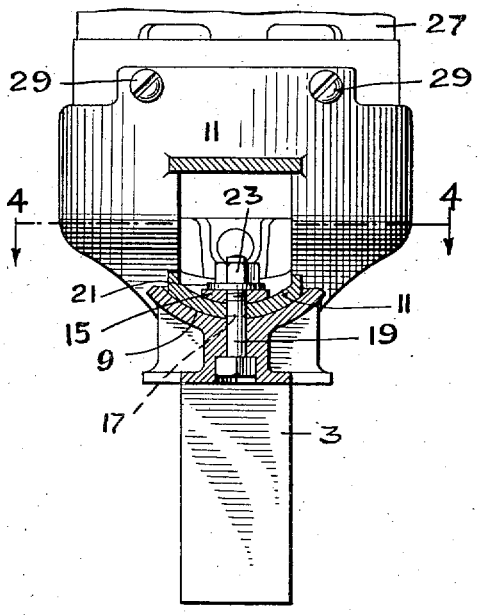
Fig. 3 is a section taken on the line 3—3 of Fig. 1, showing additional details of the mounting.
Figure 4:
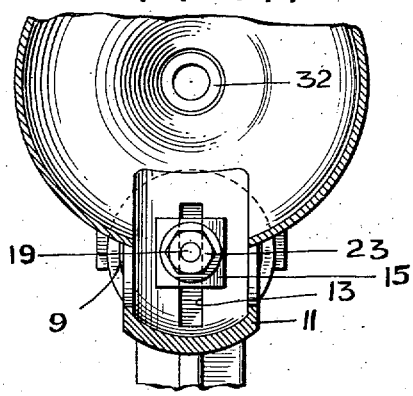
Fig. 4 is a section of the adjustable mounting, taken on the line 4—4 of Fig. 3.
Figure 6:
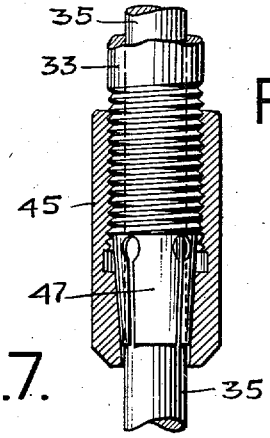
Fig. 6 is an enlarged sectional view of the hand turn grip nut for the telescopic mixing propeller shaft.
Figure 5:
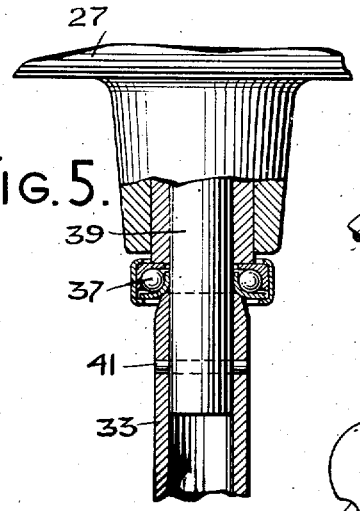
Fig. 5 is an enlarged sectional view of the thrust bearing and coupling between the motor shaft and the hollow extension thereof.
Figure 7:
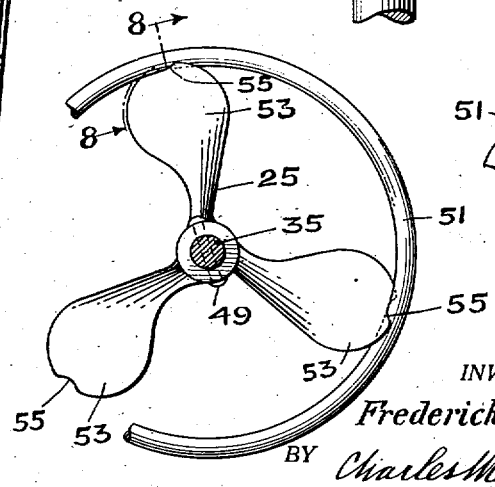
Figure 8:
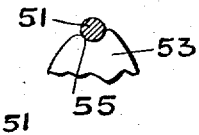
Figure 9:
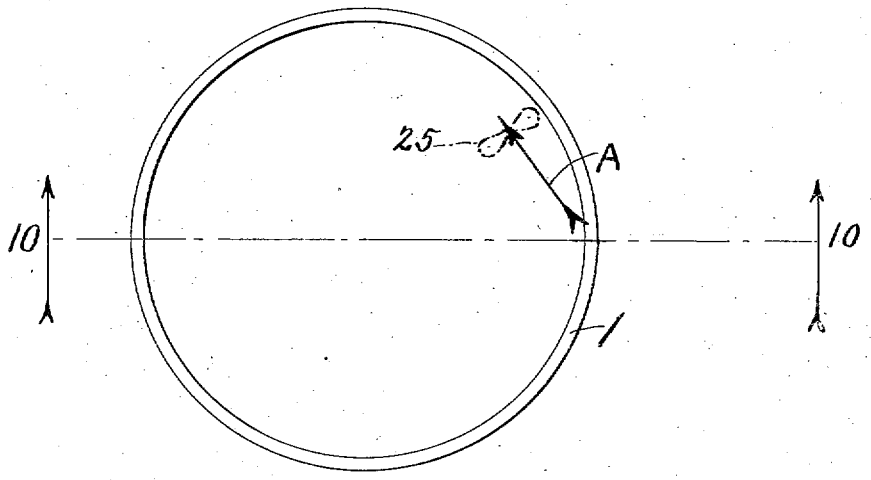
Figure 10:
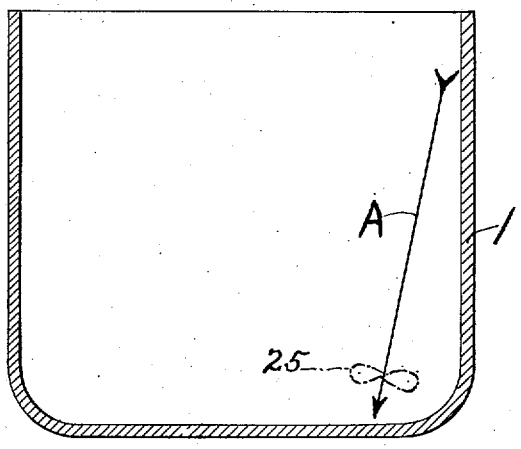

Fig. 7 is a view of the propeller and protector ring, taken on the line 7—7 of Fig. 1; and Fig. 8 is a cross-section, taken on the line 8—8 of Fig. 7, Fig. 9 is a diagrammatic plan view of a tank provided with an arrow, A, indicating the line of the propeller stream in one of its effective positions coacting with the side and bottom of the tank, and Fig. 10 is a section of Fig. 9 taken on the line 10—10.

The numeral 1 indicates the right-hand side of any tank in which the mix is to be made and upon which is fastened the clamp 3, made of cast aluminum, and detachably held in place by means of the hand-screw 5 which is provided with the hand-wheel 7.

The upper portion of the clamp 3 is provided with a hemispherical recess 9 in which is placed a hemispherical mating casting 11, provided with a slot 13, in which is placed a washer 15, having two downwardly extending lugs 17—17 to prevent rotating of the washer 15 with respect to the casting 11.

A bolt 19, having its head at the lower end, in a recess in clamp 3, extends upwardly through washer 15 and is provided with a conventional washer 21 and nut 23.

Thus the clamp 3 and the casting 11 may be adjustably locked in position with respect to each other by the nut 23. This adjustability is equivalent to that of a ball and socket joint and is universal for any practical position of the mixing propeller 25 in the tank 1.

The casting 11 extends as indicated and surrounds the lower portion of a motor 27, to which it is attached by screws 29—29, which enter the tapped holes 31—31 found in standard motors of this type.

The casting 11 also extends downwardly to form an outboard bearing which contains a grease impregnated wooden bushing 32 for the hollow portion 33 of the propeller shaft 33—35.

At the lower portion of the motor 27, a ball-thrust bearing 37 is provided, which abuts against the motor 27 and the hollow shaft 33 to take the upward thrust from the propeller 25, which, when operating, is usually found to be greater than the weight of the motor armature, etc. It is better to have the propeller thrust the mix down, both to facilitate mixing and to support the weight of the armature or rotor, shaft and propeller and thus reduce the load which must be sustained by a thrust bearing. This arrangement also reduces the stresses on the clamp and the side of the tank and thus reduces breakage of the parts in operation.

The motor shaft 39 and the hollow shaft 33 are pinned together by a pin 41, and the hollow shaft 33 is provided with a knurled hand-hold 43 and a knurled hand-clamp nut 45. The inside of the lower end of the nut 45 is of conical form to compress the slotted conical lower end 47 of hollow shaft 33 upon shaft 35 and provide telescopic adjustment between hollow shaft 33 and shaft 35 which carries the propeller 25.

Occasionally the propeller 25, which is pinned to shaft 35 by a pin 49, may accidentally be brought into contact with the mixing tank, and to prevent damage to the tank, or the propeller, a removable spring shroud ring 51 is sprung onto the propeller blades 53—53—53 and seated in suitable notches 55—55—55.

I claim:

1. The combination of a tank having a side and containing a mix, a mixing device mounted at the top of the tank, provided with a screw propeller extending down into the tank and revolvable about an axis in a vertical plane external to the centre axis of the adjacent mix in the tank, whereby a propeller stream of the mix may impinge upon and coact with the side of the tank to effect a rolling of the mix and a thorough mixture thereof.

2. The combination of a tank having a side and containing a mix, a mixing device provided with a universally adjustable mounting designed for locking in any desired position, mounted at the top of the tank, provided with a screw propeller extending down into the tank and revolvable about an axis in a vertical plane external to the centre axis of the tank, whereby propeller stream of the mix may impinge upon and coact with the side of the tank to effect a rolling of the mix and a thorough mixture thereof.

3. The combination of a tank having a side wall and a bottom and containing a mix, a mixing device mounted at the top of the tank, provided with a screw propeller extending down into the tank and revolvable about an axis in a vertical plane external to the centre axis of the adjacent mix in the tank, whereby a propeller stream of the mix may impinge upon and coact with wall and bottom members of the tank to effect a combined action consisting of a rolling of the mix at the wall, a pulverizing at the bottom, and a thorough mixture thereof.

4. The combination of a tank having a side and a bottom and containing a mix, a mixing device including a universally adjustable mounting and mounted at the top of the tank, provided with a screw propeller extending down into the tank and revolvable about an axis in a vertical plane external to the centre axis of the tank, whereby a propeller stream of the mix may impinge upon and coact with the side and the bottom of the tank to effect a combined action consisting of a rolling of the mix at the side, a pulverizing at the bottom, and a thorough mixture thereof.

5. A mixing device provided with attachment means and designed for mounting at the top of a tank having a side, provided with a screw propeller designed to extend down into the tank and to be revolvable about an axis in a vertical plane external to the centre axis of the tank, whereby a propeller stream of a mix may impinge upon and coact with the side of the tank to effect a rolling of the mix and a thorough mixture thereof.

6. The combination of a tank having a side and containing a mix, a mixing device mounted at the top of the tank including a telescopic shaft provided with a screw propeller extending down into the tank and revolvable about an axis in a vertical plane external to the centre axis of the adjacent mix in the tank at a preferred height fixed by the then extension of the telescopic shaft, whereby a propeller stream of the mix may impinge upon and coact at a preferred height with the side of the tank to effect a rolling of the mix and a thorough mixture thereof.

7. The combination of a tank having a side and containing a mix, a mixing device mounted at the top of the tank, provided with a screw propeller extending down into the tank and revolvable about an axis in a vertical plane external to the centre axis of the adjacent mix in the tank, whereby a propeller stream of the mix may impinge upon and coact with the side of the tank to effect a rolling of the mix and a thorough mixture thereof, and means to adjust the position of the propeller axis with relation to the axis of the mix.

8. The combination of a tank having a side and containing a mix, a mixing device mounted upon a ball and socket adjustable bracket at the top of the tank, provided with a screw propeller extending down into the tank and revolvable about an axis in a vertical plane external to the centre axis of the adjacent mix in the tank, whereby a propeller stream of the mix may impinge upon and coact with the side of the tank to effect a rolling of the mix and a thorough mixture thereof.

9. The combination of a tank having a side and containing a mix, a mixing device mounted upon a ball and socket adjustable bracket at the top of the tank, provided with a telescopic shaft carrying a screw propeller extending down into the tank and revolvable about an axis in a vertical plane external to the centre axis of the adjacent mix in the tank, whereby a propeller stream of the mix may impinge upon and coact with the side of the tank to effect a rolling of the mix and a thorough mixture thereof.

10. Mixing apparatus comprising a rotatable shaft, a propeller thereon, and means capable of being rotated around a substantially vertical axis for adjustment for supporting said shaft so as to extend obliquely into a tank through the top thereof in a vertical plane external to the vertical centre axis of the tank.

11. A mixing device comprising a shaft having a propeller thereon, supporting means therefor, designed to be rotated around a substantially vertical axis for adjustment and mounted on the edge of a mixing tank, whereby the shaft may be adjusted to extend downwardly at an angle to any vertical plane which includes the central vertical axis of the tank.

12. A mixing device comprising a shaft having a propeller thereon, and means for rotatably mounting said shaft so as to project downwardly into a mixing tank comprising a bracket for engaging the top of the tank and means providing for angular adjustment of said shaft relative to the plane defined by said bracket and the central axis of the tank.

13. A mixing device comprising a shaft having a propeller thereon, and means for rotatably supporting said shaft so as to extend into a tank through the top thereof, said means providing for adjustment of said shaft in a vertical radial plane of the tank and in a plane angular to said radial plane.

14. A mixing device having a support provided with attachment means for securing the same to a mixing tank, a shaft rotatably mounted on said support, a motor for rotating said shaft, a propeller on said shaft, and means on said support providing for adjustment of said shaft in one vertical plane and angularly of said plane.

15. A portable mixing device comprising an extensible shaft, a propeller thereon, a motor for rotating said shaft, and a bracket on said motor having clamping means for engaging the top of a mixing tank, the connection between said motor and said bracket providing for universal adjustment of the inclination of said shaft relative to said bracket, and including means to sustain said shaft to extend in a direction external to the centre axis of the tank.

16. The combination of a tank provided with a central vertical axis, having a side and a bottom, a mixing device mounted at the top of said side and provided with a mixing shaft carrying a mixing member extending down obliquely into the tank and revolvable about an axis at one side of said central vertical axis.

17. The combination of a tank provided with a central vertical axis, having a side and a bottom a mixing device mounted at the top of said side and provided with a mixing shaft carrying a mixing member and extending down obliquely into the tank and means to fix the obliquity thereof in any preferred position at one side of said central vertical axis.

18. The combination of a tank provided with a central vertical axis, having a side and a bottom, a mixing device mounted at the top of the tank and having a telescopic shaft extending down obliquely into the tank revolvable about an oblique axis at one side of said central vertical axis and provided at its lower portion with a mixing member.

19. The combination of a tank provided with a central vertical axis, having a side and a bottom, and containing a mix, a mixing device mounted at the top of the tank, extending down into the mix, and a propelling means at the extension revolvable about an axis external to any vertical plane passing through the center of the tank and designed to create a stream of the mix along an oblique axis at one side of the said vertical axis.

20. The combination of a tank provided with a central vertical axis, having a side and a bottom, and containing a mix, a mixing device mounted at the top of the tank, secured at the edge thereof, extending down into the mix and a propelling means at the extension revolvable about an axis external to any vertical plane passing through the center of the tank and designed to create a stream of the mix along an oblique axis at one side of the said vertical axis.

21. A mixing device designed to be mounted at the top of a tank provided with a central vertical axis, having a side and a bottom and containing a mix, said device comprising a mounting means therefor for securing same on said tank, a driving means provided with an extension from said mounting means, and a propelling means at the lower portion of the extension, revolvable about an axis external to any vertical plane passing through the center of the tank and designed to create a stream in the mix along an oblique axis at one side of the vertical axis.

22. A mixing device designed to be mounted at the top of a tank provided with a central vertical axis, having a side and a bottom and containing a mix, said device comprising a mounting means therefor for securing same on said tank, an electric motor, a downwardly extending shaft driven thereby, carrying a screw propeller, revolvable about an axis external to any vertical plane passing through the center of the tank and designed to create a stream in the mix along an oblique axis at one side of the vertical axis.

23. A mixing device designed for use with a tank for containing a mix, comprising a rotatable shaft having propelling means thereon, and means for mounting said device at such a tank so as to direct and hold said shaft extending downwardly into such a tank along an oblique axis at one side of the central vertical axis of such a tank.

FREDERICK L. CRADDOCK.